310-334 SR

XR 3,254,231

CROSS REFERENCE [redacted]

210

May 31, 1966 OM P. GANDHI 3,254,231

FREQUENCY CHANGER EMPLOYING A MOVING SONIC-ENERGY-REFLECTING BOUNDARY IN A SEMICONDUCTOR MEDIUM

Filed July 10, 1962

INVENTOR.

OM P. GANDHI

BY

ATTORNEY

United States Patent Office 3,254,231
Patented May 31, 1966

3,254,231

FREQUENCY CHANGER EMPLOYING A MOVING SONIC-ENERGY-REFLECTING BOUNDARY IN A SEMICONDUCTOR MEDIUM

Om P. Gandhi, Philadelphia, Pa., assignor to Philco Corporation, Philadelphia, Pa., a corporation of Delaware Filed July 10, 1962, Ser. No. 208,759
14 Claims. (Cl. 307—88.5)

The present invention constitutes a novel and improved frequency multiplier. Presently existing frequency multipliers generally comprise vacuum tube, transistor, parametric diode, or resistive diode harmonic generators which operate by recovering a selected harmonic of the input signal. Drawbacks of these devices include their inherent complexity, extremely low power conversion efficiency, and limitation to integral frequency multiplication factors.

The present invention concerns a novel ultrasonic solid state Doppler effect frequency multiplier which obviates the above mentioned drawbacks in present frequency multipliers, and, additionally, provides large and readily variable frequency mulitiplication factors. The invention utilizes a variable-thickness solid state depletion layer as the Doppler reflector.

OBJECTS

The objects of the present invention thus include: (1) the provision of a novel solid state frequency multiplier utilizing the Doppler effect, (2) the provision of a frequency multiplier which can provide large and variable frequency multiplication factors, (3) the provision of a frequency multiplier with power amplification and higher power conversion efficiency than any other multiplier known to date, (4) the provision of a novel depletion layer Doppler reflector, and (5) the provision of a frequency multiplier which is not limited to integral frequency multiplication factors. Other objects and advantages of the invention will become apparent from a consideration of the following discussion.

SUMMARY

The preferred embodiment of the piezoelectric semiconductor frequency muiltiplier of the present invention is characterized in that an electrical signal of one frequency is first applied to a depletion layer transducer to be transformed into ultrasonic vibrations. This ultrasonic energy is applied to one end of a solid state crystal medium which contains a moving sonically reflective boundary formed as a sawtooth voltage varies the thickness of a depletion layer at the other end of the medium. When the input sonic energy is reflected from the moving boundary of the depletion layer, ultrasonic energy of a different frequency and power is generated by Doppler effect. This reflected energy is then converted back to an electrical signal and fed to an output band pass filter tuned to the new frequency. The velocity of the moving reflective boundary of the depletion layer can be readily adjusted by varying the amplitude and/or frequency of the sawtooth voltage.

DRAWING

Figure 1:
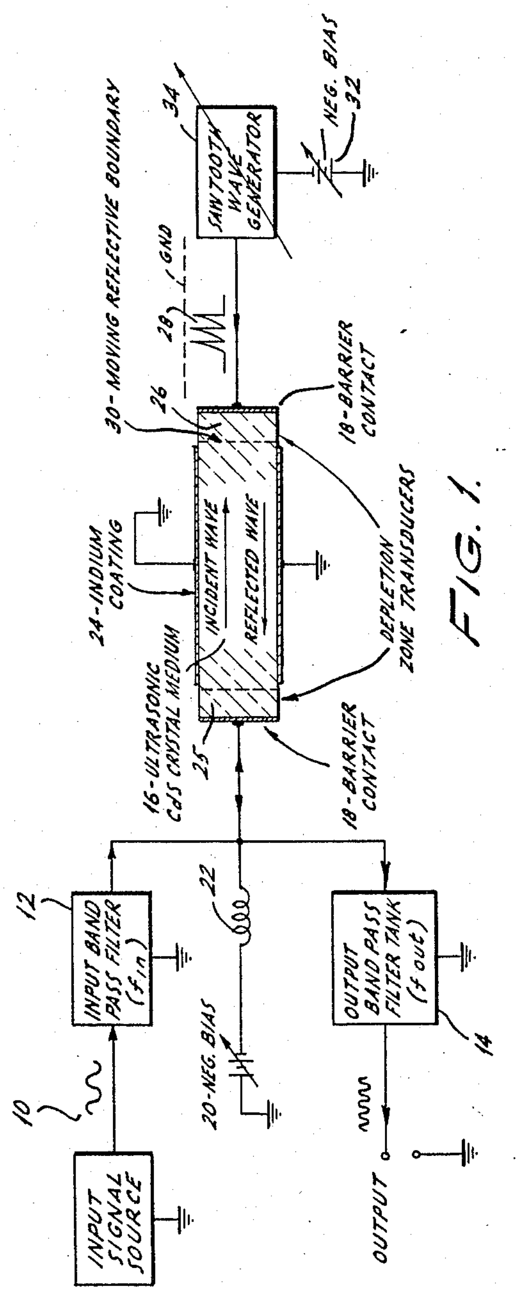
Figure 2:
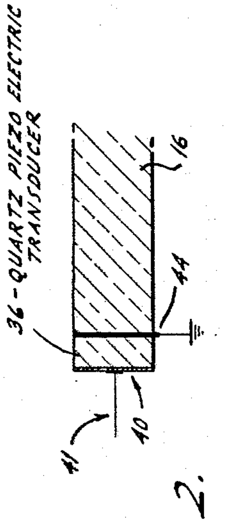

In the single sheet of drawing FIG. 1 represents a preferred embodiment of the invention wherein a depletion layer in a solid state medium is utilized as the signal transducer, and FIG. 2 represents an alternative embodiment of the invention wherein a separate piezoelectric crystal is utilized as the signal transducer.

*Description: FIG. 1*

Reference is made to FIG. 1 which depicts the preferred practical embodiment of a frequency multiplier according to the instant invention.

The input signal 10, whose frequency is to be multiplied, may be any convenient radio frequency value. Input band pass filter 12 is tuned to the frequency of input signal 10. The output band pass filter 14 is tuned to the frequency of the harmonic to be generated. The input filter desirably has an output impedance that rises with frequencies above the band pass, whereas the output filter should have a rising output impedance at frequencies below the band pass. This arrangement permits the selection of an output frequency in the desired band while suppressing direct interaction between input and output for spurious modes. The design of suitable filters is well known to those skilled in the art.

The solid state piezoelectric, semiconductive crystal medium 16 can be a single rod-shaped crystal of zinc oxide or cadmium sulfide (hexagonal form) about 2 cm. long and 1 $mm.^2$ in area with a resistivity on the order of 10,000 ohm-centimeters. The use for CdS as an ultrasonic medium is discussed in an article entitled "Ultrasonic Amplification in CdS" by Hutson et al. at page 237 of the September 15, 1961, issue (vol. 7, No. 6) of the Physical Review Letters.

The end regions 25 and 26 of the crystal 16 may be made depletion layer transducers by doping these regions to achieve a resistivity of 200 to 500 ohm-centimeters and applying a barrier forming or rectifying contact 18 composed of a thin metal film to the ends. In lieu of doping the ends of the block it is possible to achieve the relatively low resistivity depletion regions by the application of light or a combination of light and doping to the ends of the CdS crystal block. A negative bias is applied to complete the left depletion zone transducer by using bias circuit 20 which includes isolating choke 22. The other or ground end of the bias circuit is completed by coating the entire center portion of the rod with indium 24 to form an ohmic contact, and then grounding the same. The right input transducer 26, to which a sawtooth wave 28 is applied to form the moving reflective boundary 30, can be negatively biased by placing negative battery 32 between the sawtooth generator 34 and ground. Sawtooth waveform 28 should have parabolic ramp surfaces as illustrated in order for the reflective boundary of depletion zone 26 to have linear excursion since the velocity of the excursion is proportional to the square root of the applied voltage. Sawtooth generator 34 should be variable in amplitude and frequency.

*Operation: FIG. 1*

Frequency multiplication in the present invention is achieved through Doppler reflection of an ultrasonic wave from a moving reflective boundary or mirror.

The R.F. signal 10 is applied to ultrasonic transducer 25 through band pass filter 12. The purpose of the input band pass filter 12 is to act as a one-way gate to isolate the input source from the harmonics and parametric effects generated by the frequency multiplier.

The input depletion zone transducer 25 receives most of the voltage drop from the input signal. Large piezoelectric stresses are thus produced in the depletion zone causing it to vary its thickness and thereby generate electro-mechanical waves in the acoustic medium 16 which conform to the input signal 10. The ultrasonic electromechanical wave energy generated travels down the rod-shaped medium 16 and is reflected from the moving reflective boundary 30 produced by sawtooth wave generator 34 and its associated depletion zone transducer 26.

The sawthooth wave voltage 28 acts upon the transducer 26 (in the same way the input signal 10 acts upon its transducer 25) to vary the thickness of the depletion layer and thus produce moving reflective boundary 30. In following the parabolic-ramp sawtooth voltage 28, boundary 30 recurrently moves with a linear velocity to the left and then instantly returns. Moving boundary 30 constitutes a discontinuity in medium 16 which will reflect the incident electromechanical wave energy to change the power and frequency of the incident signal in accordance with the well known Doppler effect. (For a further discussion of the Doppler phenomenon reference is made to an article entitled "Use of the Principles of Conservation of Energy and Momentum in Connection with the Operation of Wave-Type Parametric Amplifiers," by Pierce at page 1341 of the September 1959 issue of the Journal of Applied Physics (vol. 30, No. 9).) Large frequency multiplication factors will be created if the velocity of the reflector approximates that of the incident wave. The velocity of the recurrent reflective boundary can bei ncreased by increasing the frequency or magnitude of sawtooth wave 28. For frequency multiplication the velocity of the reflective boundary must approach that of the incident wave, and the excursions of the reflective boundary (due to the ramp portion of the sawtooth) should move toward the incident signal. It should be mentioned that since the variation in thickness of a depletion layer is a majority carrier phenomenon, the excursions of the boundary of the depletion layer can exactly follow the sawtooth waveform without any hysteresis; thus the return excursion of the boundary is, for all intents and purposes, instantaneous, and has no adverse effect on Doppler reflection. It will be obvious that an increase in frequency or amplitude of sawtooth voltage 28 will increase the velocity of reflective boundary 30.

When the reflected energy reaches transducer 25 it is transformed back to an electrical signal and this is recovered in output filter 14 which is tuned to the frequency of the reflected signal.

Spurious signals generated in the frequency converter are eliminated in the output filter 14. The most likely spurious response will probably be due to parametric harmonics generated from the variable capacitance characteristic of the transducer. This can most readily be suppressed by operating the input and output at frequencies that are not integrally related.

*Description: FIG. 2*

FIG. 2 depicts an alternative embodiment of the invention wherein a piezoelectric signal transducer is utilized instead of a depletion zone signal transducer. Any piezoelectric material such as quartz or a Rochelle salt is suitable for this application.

In FIG. 2 the CdS crystal rod is physically the same as before, but no indium coating is required thereon since there is no electrical coupling to the medium in this embodiment. A quartz end plate, 36 takes the place of the left depletion zone transducer. An electrode 41 can be applied to the outside horizontal end 40 of the quartz transducer through the use of familiar film evaporation and soldering or electrodeposition and soldering techniques. The inside end of the piezoelectric transducer 36 may be electrically contacted through the use of a thin metal plate electrode 44 which constitutes the ground connection therefor. The quartz transducer, with electrodes attached, is mounted in direct physical contact with the CdS ultrasonic medium as shown. Otherwise the rest of the embodiment of FIG. 2, which is not depicted, is identical in operation and structure to the embodiment of FIG. 1.

*Operation: FIG. 2*

The embodiment of FIG. 2 is identical to that of FIG. 1 save for the signal transducer 36 which is of a standard piezoelectric material rather than a solid state depletion zone. The desirably quartz piezoelectric transducer 36, with electrodes attached, is placed in direct physical contact with crystal 16. When the signal voltage 10 is applied thereto, the ultrasonic vibrations produced by the quartz transducer are mechanically coupled to the ultrasonic medium 16 through the metallic contact plate 44. When the reflected ultrasonic energy returns the transducer retransforms it into electrical energy as before.

CONCLUSION

It is thus seen that a novel and improved frequency multiplier is obtained through this invention. The multiplication factor is not limited to an integral number as in the usual harmonic generating frequency multipliers, but can be continuously adjusted by variation of the velocity of the reflecting surface through either frequency or amplitude adjustment of the sawtooth oscillator. The output filter, of course, must be adjusted so that the frequency of the desired output signal will lie within its band pass. The power conversion efficiency of the subject invention is considerably higher than presently existing converters due to the fact that the input signal power is amplified into the output signal (the increased reflected power is due to the work done by the mirror on the incident signal) rather than having a harmonic portion of the input signal selected as the output.

While the instant invention has been described in detail it is not intended that this description or the embodiments be constructed as a limitation of the scope of the invention. The true scope of the invention is intended to be limited only by the language of the following claims.

I claim:

1. In combination: a source of electrical signal energy, a sonic transducer connected to said source, a medium capable of transmitting sonic energy coupled to said transducer, means to produce a moving sonically reflective boundary in said medium, so that sonic energy may be reflected from said moving boundary, and means to recover an electrical output signal from said sonic transducer after said reflected sonic energy returns to said transducer.

2. The combination as claimed in claim 1 where said medium is a solid state crystalline medium.

3. The combination as claimed in claim 2 where said solid state medium is cadmium sulfide.

4. The combination as claimed in claim 2 where said solid state medium is zinc oxide.

5. Apparatus for multiplying the frequency of an electrical signal comprising: an elongated body of piezoelectric semiconducting material having respective end regions which have been doped to achieve a lower resistivity than the rest of said material, means to connect a portion of said body to a source of reference potential, means connected to each of said end regions to form a rectifying contact therewith, means to apply a signal of one frequency to one of said rectifying contacts, means connected to another of said rectifying contacts to apply a sawtooth voltage to said other contact, and means to recover a signal of another frequency from said one rectifying contact.

6. In combination: a body of material capable of transmitting sonic energy, a piezoelectric transducer, placed adjacent a portion of said body of material, for supplying sonic energy to said body in response to an electrical input signal supplied to said transducer, means supplying an electrical input signal to said transducer, means producing a moving sonic mirror in said material so that sonic energy supplied to said material by said transducer will be reflected from said mirror, said transducer being adapted to produce an electrical output signal in response to sonic energy reflected from said mirror and incident on said transducer, and means to recover said electrical output signal from said transducer.

7. Apparatus for changing the frequency of an electronic signal comprising: an elongated body of piezoelectric semiconductive material having first and second end portions, said first and said second end portions being doped and biased to form depletion regions, a source of periodically-varying electrical signal energy coupled across said first end portion, and another source of periodically-varying electrical signal energy coupled across said second end portion.

8. A body of piezoelectric semiconductive material, means responsive to a voltage supplied thereto to form in a portion of said body a depletion layer having a boundary the position of which depends on the value of said voltage, and means supplying a substantially sawtooth waveform of voltage to said voltage responsive means whereby said boundary of said depletion layer takes repetitive excursions to provide a moving sonic mirror in said material.

9. A rod-shaped body of semiconductive material, an end of which is arranged to form a depletion region, means supplying an ohmic contact to a center portion of said rod, means to connect said last-named means to a reference potential source, means to vary periodically the thickness of said depletion region, and means injecting ultrasonic energy in another end of said rod.

10. The combination of claim 9 wherein said material is a piezoelectric semiconductor and said injecting means comprises another depletion layer in said other end of said rod.

11. The combination of claim 9 where said injecting means comprises a piezoelectric transducer in contact with said other end of said rod.

12. Apparatus for changing the frequency of an electrical signal comprising: transducing means capable of transforming electrical energy into sonic energy and sonic energy into electrical energy, means to apply said electrical signal to said transducing means to produce sonic energy, means including a Doppler mirror, to change the frequency of said sonic energy, said transducing means being responsive to sonic energy of said changed frequency incident thereon to produce an electrical signal of said changed frequency, and means to apply said sonic energy of said changed frequency to said transducing means whereby an electrical signal of said changed frequency may be obtained from said transducing means.

13. In combination: a body of semiconductive material capable of transmitting sonic energy, a piezoelectric transducer placed adjacent said body of semiconductive material, means supplying an electrical signal to said transducer, means producing in said body of semiconductive material a depletion layer having a moving boundary reflective of sonic energy, so that sonic energy supplied to said body from said transducer will be reflected by said boundary, and means to recover an output signal from said transducer.

14. Apparatus for changing the frequency of an electronic signal comprising: an elongated body of piezoelectric semiconductive material having first and second end portions, said first and said second end portions being doped and biased to form depletion regions, a source of electrical signal energy coupled across said first end portion, and another source of electrical signal energy coupled across said second end portion and supplying thereto a substantially sawtooth waveform.

References Cited by the Examiner

UNITED STATES PATENTS

| | | | |
|---|---|---|---|
| 3,185,935 | 5/1965 | White | 307—88.5 X |
| 3,185,942 | 5/1965 | White | 333—72 X |

OTHER REFERENCES

IRE International Convention Record, vol. 9 Part 6, 1961, "Depletion Layer Transducer—a New High Frequency Ultrasonic Transducer," by D. L. White pages 304–309.

IBM Technical Disclosure Bulletin, vol. 3, No. 7, December 1960 "Single Shot Amplifier," by R. W. Landauer.

ARTHUR GAUSS, *Primary Examiner.*

J. ZAZWORSKY, *Assistant Examiner.*